US011429156B1

(12) United States Patent
Hsu et al.

(10) Patent No.: US 11,429,156 B1
(45) Date of Patent: Aug. 30, 2022

(54) NOTEBOOK COMPUTER (71) Applicant: Quanta Computer Inc., Taoyuan (TW)

(72) Inventors: Chia-Jung Hsu, Taoyuan (TW);
Chin-Kuo Wang, Taoyuan (TW);
Yi-Chieh Liu, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 17/361,778

(22) Filed: Jun. 29, 2021

(30) Foreign Application Priority Data

May 10, 2021 (TW) .................................. 110116673

(51) Int. Cl.
*G06F 1/16* (2006.01)
*G06F 1/20* (2006.01)

(52) U.S. Cl.
CPC .......... *G06F 1/1688* (2013.01); *G06F 1/1613* (2013.01); *G06F 1/1616* (2013.01); *G06F 1/1624* (2013.01); *G06F 1/1684* (2013.01); *G06F 1/1686* (2013.01); *G06F 1/203* (2013.01)

(58) Field of Classification Search
CPC .... G06F 1/1688; G06F 1/1684; G06F 1/1686; G06F 1/1692; G06F 1/1613; G06F 1/1616; G06F 1/1624; G06F 1/20; G06F 1/203; G06F 1/206
See application file for complete search history.

(56) References Cited

U.S. PATENT DOCUMENTS

| 10,466,750 | B2* | 11/2019 | Lee | G06F 1/165 |
| 10,534,408 | B2* | 1/2020 | Cheng | G06F 1/1616 |
| 10,635,142 | B2* | 4/2020 | Cheng | G06F 1/1681 |
| 10,936,015 | B2* | 3/2021 | Liu | G06F 1/1624 |
| 11,079,809 | B2* | 8/2021 | Morino | G06F 1/1681 |
| 11,132,026 | B2* | 9/2021 | Yang | G06F 1/1647 |
| 2012/0127652 | A1* | 5/2012 | Lin | H01L 23/467 361/688 |
| 2019/0171255 | A1* | 6/2019 | Cheng | G06F 1/1616 |
| 2019/0250674 | A1* | 8/2019 | Lin | G06F 1/1616 |
| 2019/0317552 | A1* | 10/2019 | Cheng | E05D 11/00 |

FOREIGN PATENT DOCUMENTS

| TW | M578813 U | 6/2019 |
| TW | M599076 U | 7/2020 |

OTHER PUBLICATIONS

Chinese language office action dated Nov. 8, 2021, issued in application No. TW 110116673.

* cited by examiner

*Primary Examiner* — Nidhi Thaker
(74) *Attorney, Agent, or Firm* — McClure, Qualey & Rodack, LLP (57) ABSTRACT

A notebook computer is provided. The notebook computer includes a device body, a cover and a media unit. The device body includes a first body housing and a second body housing, wherein the second body housing pivots on the first body housing. The cover pivots on the first body housing and is slidably connected to the second body housing. When the cover is rotated from a folded state to an unfolded state relative to the device body, the second body housing is pushed to rotate from the first housing orientation to the second housing orientation relative to the first body housing. The media unit pivots on the first body housing and is slidably connected to the second body housing.

9 Claims, 7 Drawing Sheets

NOTEBOOK COMPUTER

CROSS REFERENCE TO RELATED APPLICATIONS

[0001] This application claims priority of Taiwan Patent Application No. 110116673, filed on May 10, 2021, the entirety of which is incorporated by reference herein.

BACKGROUND OF THE INVENTION

Field of the Invention

The present invention relates to a notebook computer, and in particular to a notebook computer with a media unit.

Description of the Related Art

Conventionally, the device body of the notebook computer includes a first body housing (upper housing) and a second body housing (lower housing). The first body housing (upper housing) is combined to the second body housing (lower housing), and there is no relative movement between the first body housing (upper housing) and the second body housing (lower housing). Heat dissipation holes are formed on the second body housing (lower housing). With increasingly computing requirements of the notebook computer, the conventional heat dissipation holes cannot satisfy the increased heat dissipation requirements. Additionally, the speaker of the notebook computer should not be disposed on the cover and occupy limited screen-mounting-space of the cover. However, if the speaker is disposed on the device body, the speaker cannot face to the user, and the auditory experience of the user suffers.

BRIEF SUMMARY OF THE INVENTION

Embodiments of the invention are provided to address the aforementioned difficulty.

In one embodiment, a notebook computer is provided. The notebook computer includes a device body, a cover and a media unit. The device body includes a first body housing and a second body housing, wherein the second body housing pivots on the first body housing. The cover pivots on the first body housing and is slidably connected to the second body housing, wherein when the cover is rotated from a folded state to an unfolded state relative to the device body, the second body housing is pushed to rotate from a first housing orientation to a second housing orientation relative to the first body housing. The media unit pivots on the first body housing and is slidably connected to the second body housing, wherein when the second body housing is rotated from the first housing orientation to the second housing orientation relative to the first body housing, the media unit is rotated from the first unit orientation to the second unit orientation.

In one embodiment, the cover comprises a shaft and a cam. The cover pivots on the first body housing via the shaft. The cam is telescoped on the shaft and is rotated with the shaft. The cam is connected to the second body housing.

In one embodiment, the second body housing comprises a housing groove. The cam comprises a cam post that is inserted into the housing groove and is moved along the housing groove.

In one embodiment, the media unit comprises a unit body and a unit linkage. The unit linkage is affixed to the unit body and is slidably connected to the second body housing.

In one embodiment, the unit linkage comprises a linkage slot. The second body housing comprises a housing post that is inserted into the linkage slot and is moved along the linkage slot.

In one embodiment, the second body housing comprises an inner wall. The housing groove is formed on a first wall surface of the inner wall. The housing post is formed on a second wall surface of the inner wall. The first wall surface is opposite to the second wall surface.

In one embodiment, the first body housing comprises a shaft base. The shaft passes through the shaft base and is rotated relative to the shaft base. The shaft comprises a shaft stopper. The shaft base comprises a base stopper. When the cover is rotated to an extreme state relative to the device body, the shaft stopper abuts the base stopper.

In one embodiment, the first body housing comprises a first housing pivoting portion. The second body housing comprises a second housing pivoting portion. The first housing pivoting portion pivots on the second housing pivoting portion. The cover pivots on the first side of the device body. The first housing pivoting portion and the second housing pivoting portion are located on the second side of the device body. The first side is opposite to the second side.

In one embodiment, when the second body housing is in the first housing orientation relative to the first body housing, a first distance is formed between the shaft and the bottom of the second body housing. When the second body housing is in the second housing orientation relative to the first body housing, a second distance is formed between the shaft and the bottom of the second body housing. The second distance is greater than the first distance.

In one embodiment, the media unit is a speaker, and when the media unit is in the first unit orientation, a first included angle is formed between the unit body and the first body housing. When the media unit is in the second unit orientation, a second included angle is formed between the unit body and the first body housing. The second included angle is greater than the first included angle.

In the embodiment of the invention, when the cover is rotated from the folded state to the unfolded state relative to the device body, the second body housing is rotated from the first housing orientation to the second housing orientation relative to the first body housing. Therefore, the gap between the first body housing and the second body housing can be increased, the air intake of the fan of the notebook computer can be increased, and the heat dissipation efficiency is improved. Additionally, when the second body housing is rotated from the first housing orientation to the second housing orientation relative to the first body housing, the media unit (such as speaker) is rotated from the first unit orientation to the second unit orientation and faces to the user. The media unit (such as speaker) faces to the user automatically, and provides improved auditory experience. Additionally, the media unit (such as speaker) of the embodiment of the invention is disposed on the device body, and does not occupy limited screen-mounting-space of the cover.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
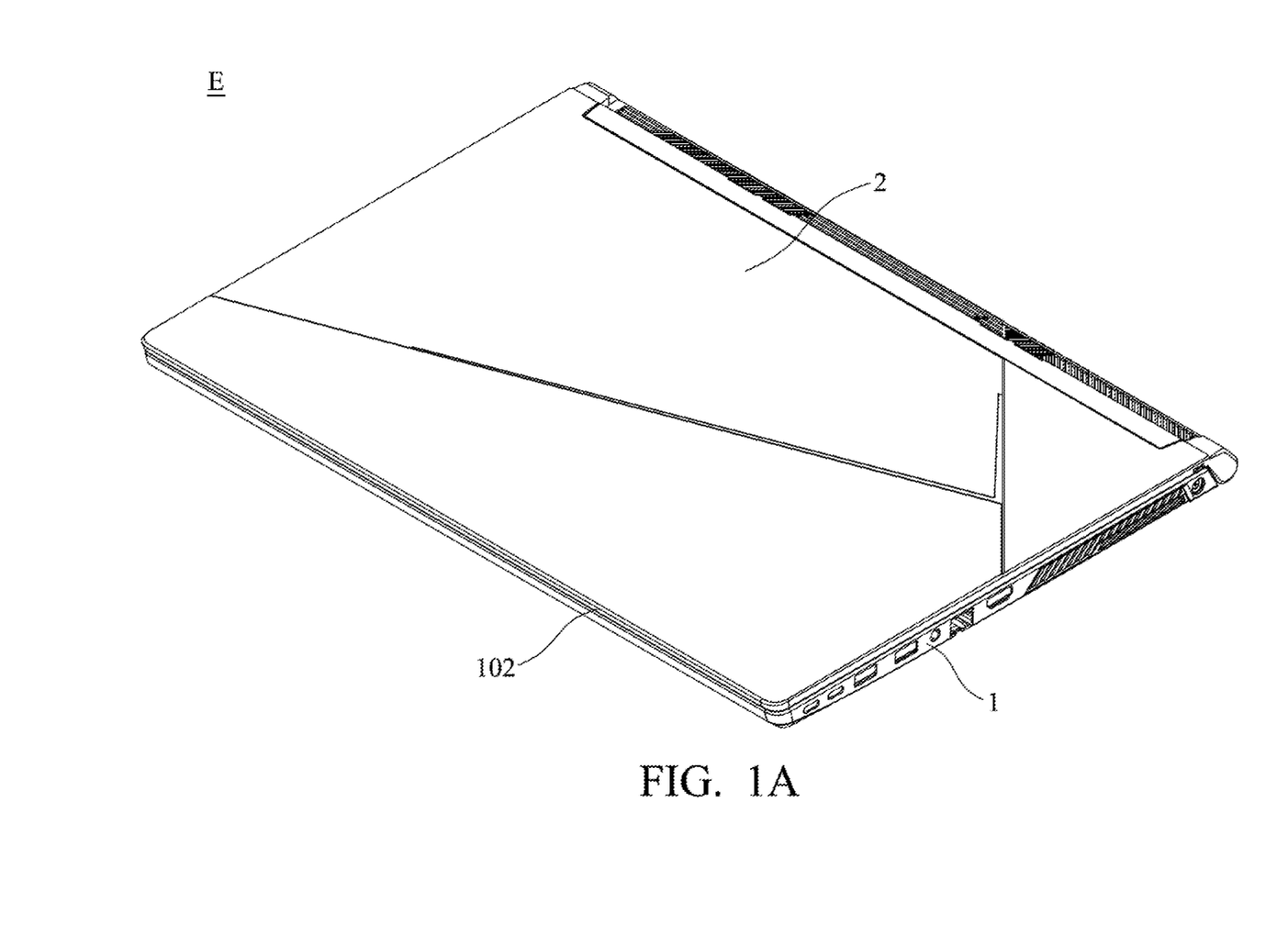
FIG. 1A shows a notebook computer of an embodiment of the invention, wherein a cover is in a folded state relative to a device body.
Figure 1B:
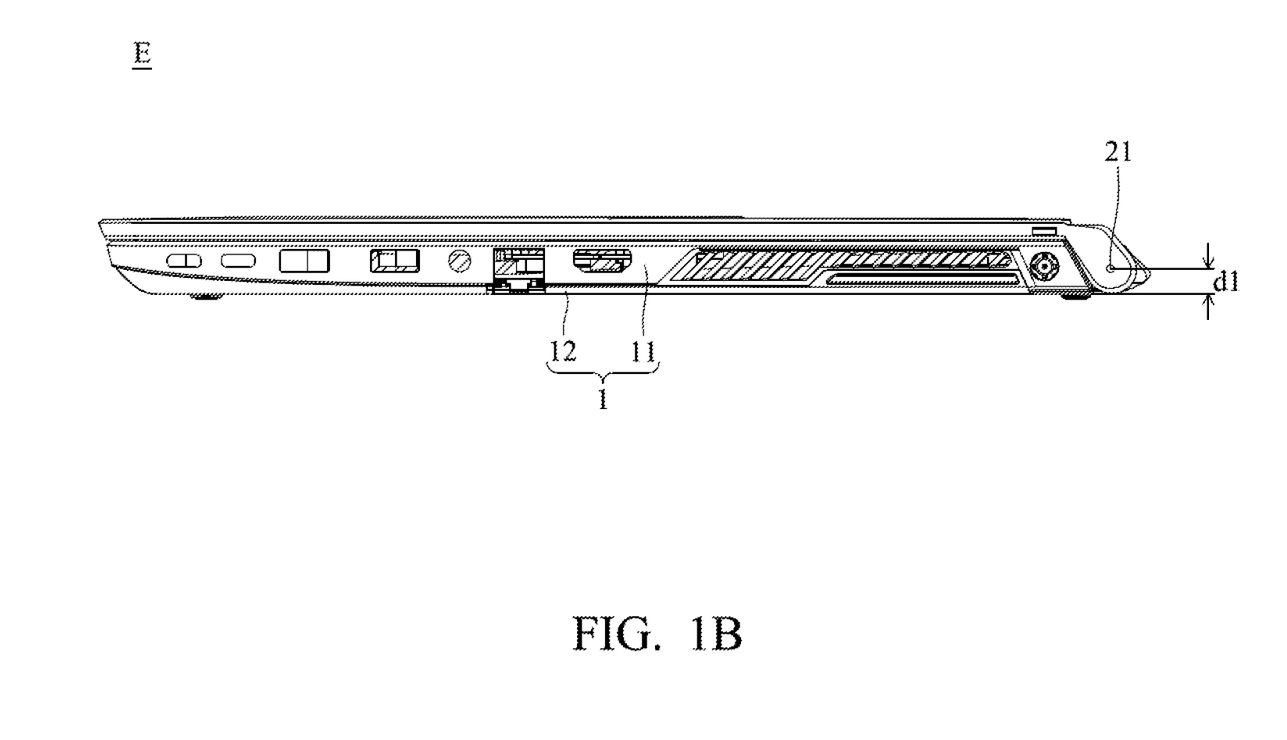
FIG. 1B shows the device body of the embodiment of the invention, wherein the cover is in the folded state relative to the device body.
Figure 2A:
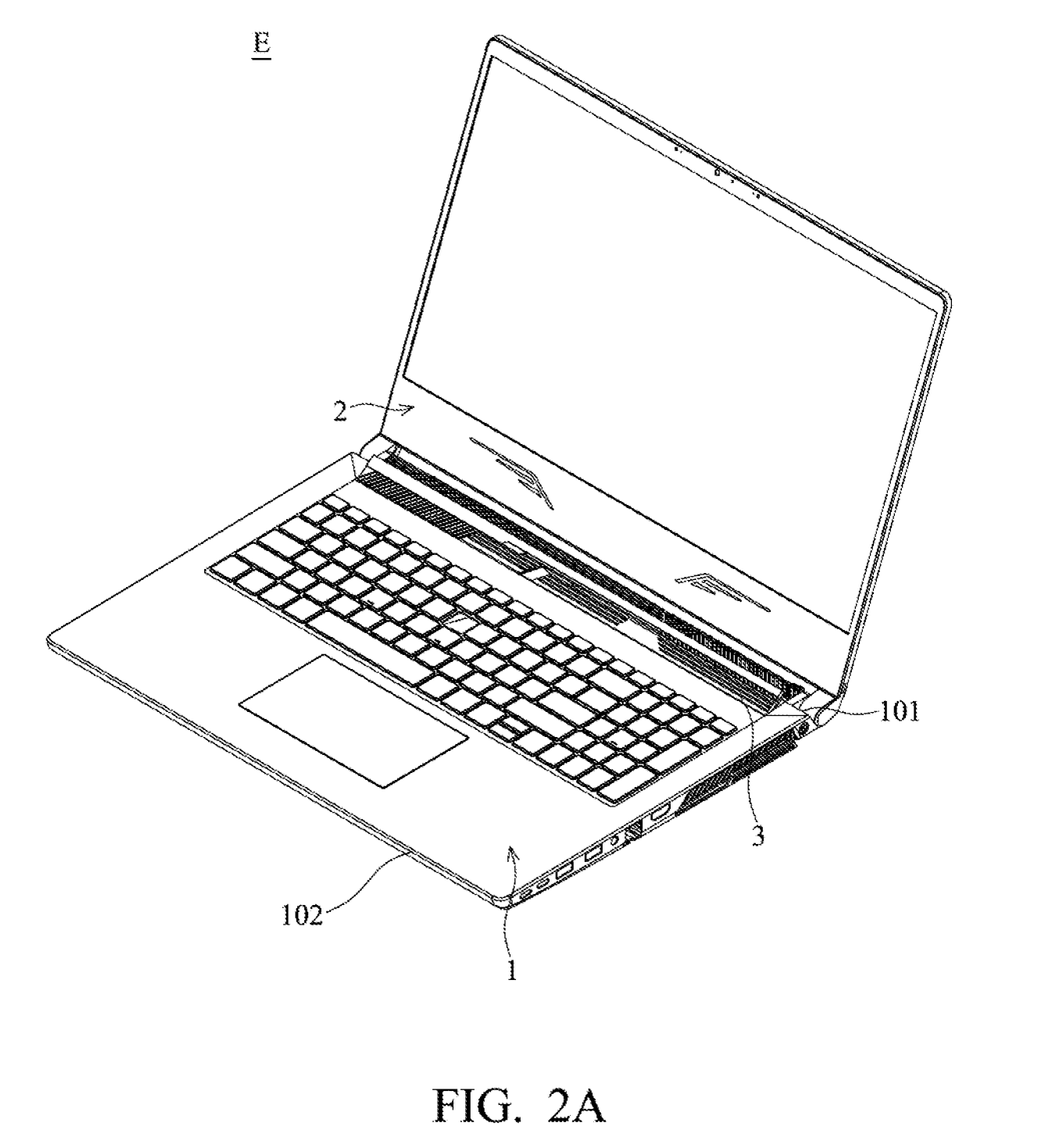
FIG. 2A shows a notebook computer of an embodiment of the invention, wherein the cover is in an unfolded state relative to the device body.
Figure 2B:
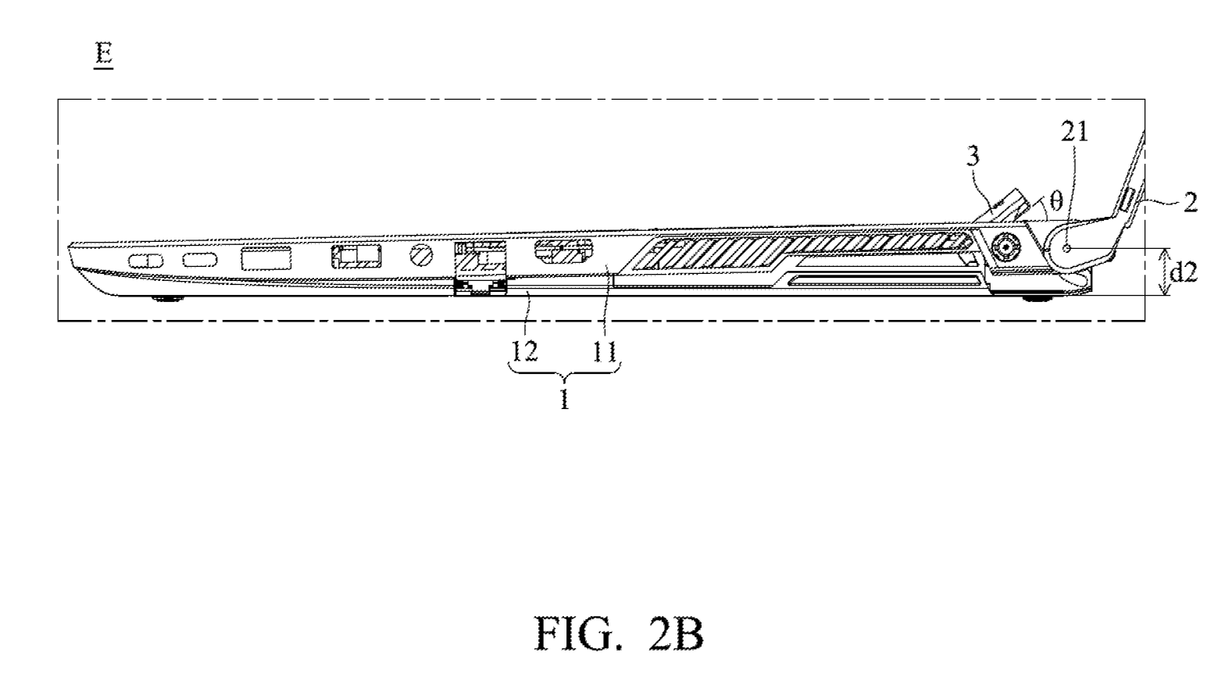
FIG. 2B shows the device body of the embodiment of the invention, wherein the cover is in the unfolded state relative to the device body.

FIG. 1A shows a notebook computer of an embodiment of the invention, wherein a cover is in a folded state relative to a device body. FIG. 1B shows the device body of the embodiment of the invention, wherein the cover is in the folded state relative to the device body. FIG. 2A shows a notebook computer of an embodiment of the invention, wherein the cover is in an unfolded state relative to the device body. FIG. 2B shows the device body of the embodiment of the invention, wherein the cover is in the unfolded state relative to the device body. With reference to FIGS. 1A, 1B, 2A and 2B, in one embodiment, the notebook computer E is provided. The notebook computer E includes a device body 1, a cover 2 and a media unit 3. The device body 1 includes a first body housing 11 and a second body housing 12. The second body housing 12 pivots on the first body housing 11. The cover 2 pivots on the first body housing 11 and is slidably connected to the second body housing 12. When the cover 2 is rotated from a folded state (FIGS. 1A and 1B) to an unfolded state (FIGS. 2A and 2B) relative to the device body 1, the second body housing 12 is pushed to rotate from a first housing orientation (FIGS. 1A and 1B) to a second housing orientation (FIGS. 2A and 2B) relative to the first body housing 11. The media unit 3 pivots on the first body housing 11 and is slidably connected to the second body housing 12. When the second body housing 12 is rotated from the first housing orientation (FIGS. 1A and 1B) to the second housing orientation (FIGS. 2A and 2B) relative to the first body housing 11, the media unit 3 is rotated from the first unit orientation (not shown) to the second unit orientation (FIGS. 2A and 2B).

In one embodiment, the media unit 3 can be a speaker. The disclosure is not meant to restrict the invention.

Figure 3A:
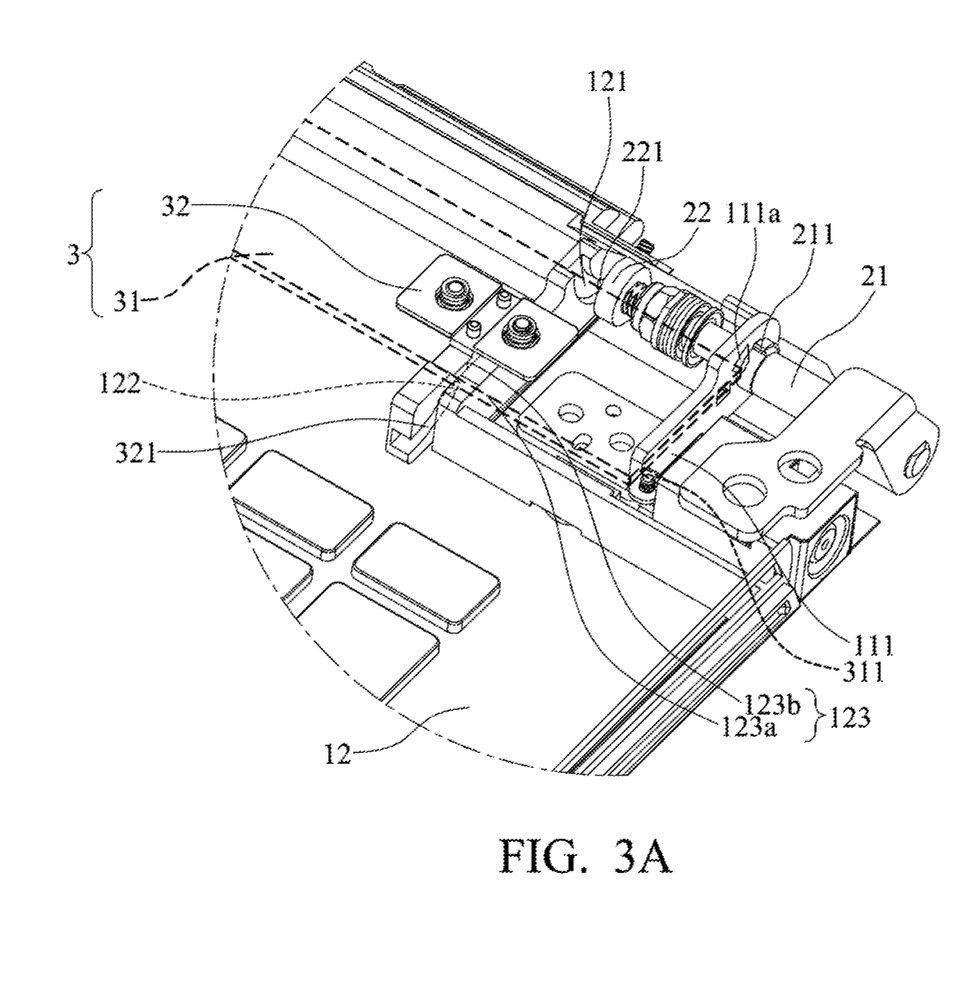
FIG. 3A shows a cam of the embodiment of the invention, wherein the cover is in the folded state relative to the device body.
Figure 3B:
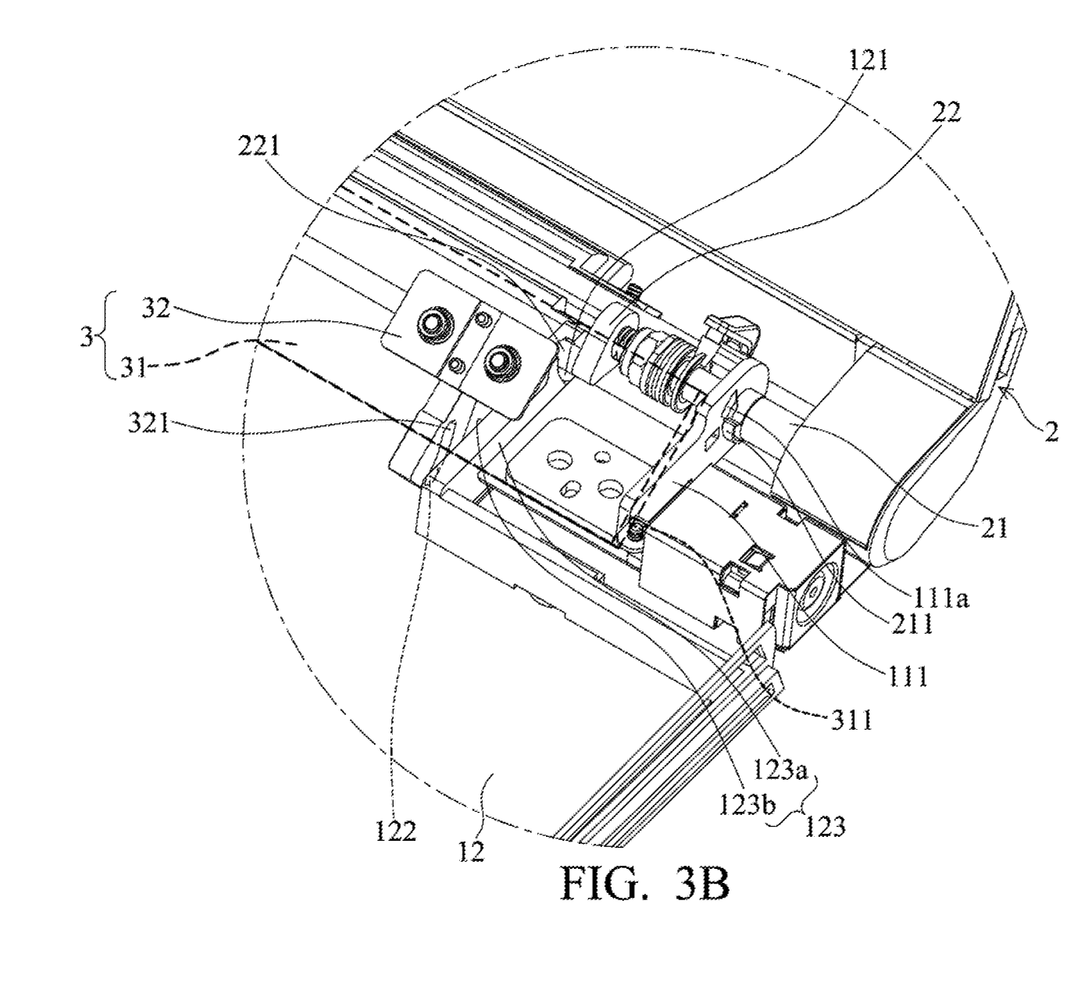
FIG. 3B shows the cam of the embodiment of the invention, wherein the cover is in the unfolded state relative to the device body.

FIG. 3A shows a cam of the embodiment of the invention, wherein the cover is in the folded state relative to the device body. FIG. 3B shows the cam of the embodiment of the invention, wherein the cover is in the unfolded state relative to the device body. In order to clearly show the structure of the embodiment of the invention, a portion of the first body housing is hidden. With reference to FIGS. 3A and 3B, in one embodiment, the cover 2 comprises a shaft 21 and a cam 22. The cover 2 pivots on the first body housing 11 via the shaft 21. The cam 22 is telescoped on the shaft 21 and is rotated with the shaft 21, and the cam 22 is connected to the second body housing 12.

With reference to FIGS. 3A and 3B, in one embodiment, the second body housing 12 comprises a housing groove 121. The cam 22 comprises a cam post 221. The cam post 221 is inserted into the housing groove 121 and is moved along the housing groove 121.

With reference to FIGS. 3A and 3B, in one embodiment, the media unit 3 comprises a unit body 31 and a unit linkage 32. The unit linkage 32 is affixed to the unit body 31. The unit linkage 32 is slidably connected to the second body housing 12.

With reference to FIGS. 3A and 3B, in one embodiment, the unit linkage 32 comprises a linkage slot 321. The second body housing 12 comprises a housing post 122. The housing post 122 is inserted into the linkage slot 321 and is moved along the linkage slot 321.

With reference to FIGS. 3A and 3B, in one embodiment, the second body housing 12 comprises an inner wall 123. The housing groove 121 is formed on a first wall surface 123a of the inner wall 123. The housing post 122 is formed on a second wall surface 123b of the inner wall 123. The first wall surface 123a is opposite to the second wall surface 123b.

With reference to FIGS. 3A and 3B, in one embodiment, the first body housing 11 comprises a shaft base 111. The shaft 21 passes through the shaft base 111 and is rotated relative to the shaft base 111. The shaft 21 comprises a shaft stopper 211. The shaft base 111 comprises a base stopper 111a. When the cover is rotated to an extreme state relative to the device body, the shaft stopper 211 abuts the base stopper 111a.

Figure 4:
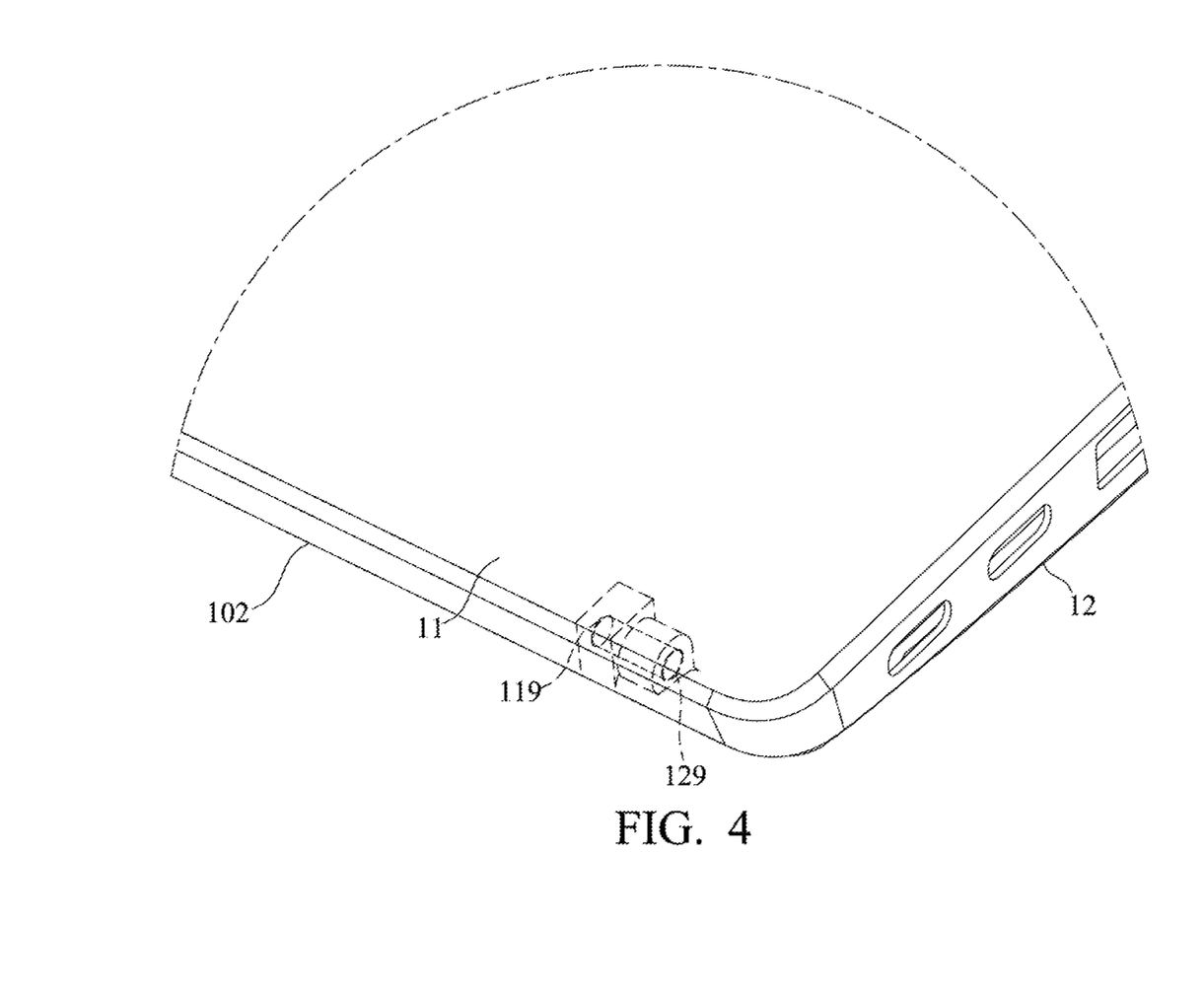
FIG. 4 shows the first body housing pivoting on the second body housing of the embodiment of the invention.

FIG. 4 shows the first body housing pivoting on the second body housing of the embodiment of the invention. With reference to FIGS. 1A, 2A and 4, in one embodiment, the first body housing 11 comprises a first housing pivoting portion 119. The second body housing 12 comprises a second housing pivoting portion 129. The first housing pivoting portion 119 pivots on the second housing pivoting portion 129. The cover 2 pivots on the first side 101 of the device body 1. The first housing pivoting portion 119 and the second housing pivoting portion 129 are located on the second side 102 of the device body 1. The first side 101 is opposite to the second side 102.

With reference to FIGS. 1B and 2B, in one embodiment, when the second body housing 12 is in the first housing orientation (FIG. 1B) relative to the first body housing 11, a first distance d1 is formed between the shaft 21 and the bottom of the second body housing 12. When the second body housing 12 is in the second housing orientation (FIG. 2B) relative to the first body housing 11, a second distance d2 is formed between the shaft 21 and the bottom of the second body housing 12. The second distance d2 is greater than the first distance d1.

With reference to FIGS. 2B, 3A and 3B, in one embodiment, the media unit 3 is a speaker. The media unit 3 pivots on the first body housing via a unit pivoting portion 311. When the media unit 3 is in the first unit orientation (FIG. 3A), a first included angle (0°) is formed between the unit body and the first body housing 11. When the media unit 3 is in the second unit orientation (FIGS. 2B and 3B), a second included angle θ is formed between the unit body and the first body housing 11, and the second included angle is greater than the first included angle.

With reference to FIGS. 3A, 3B and 4, in the embodiment of the invention, wherein the cover is rotated from the folded state to the unfolded state relative to the device body, the cam 22 is rotated with the shaft 21 to move the cam post 221 along the housing groove 121, and the second body housing 12 is moved from the first housing orientation to the second housing orientation relative to the first body housing 11 (the second body housing 12 pivots on the first body housing 11 via the first housing pivoting portion 119 and the second housing pivoting portion 129). During the second body housing 12 being moved from the first housing orientation to the second housing orientation relative to the first body housing 11, the housing post 122 of the second body housing 12 slides along the linkage slot 321 to rotate the media unit 3 from the first unit orientation to the second unit orientation relative to the first body housing 11 (the media unit 3 pivots on the first body housing via the unit pivoting portion 311). There during the caver being rotated, the second body housing 12 is rotated relative to the first body housing automatically, and the media unit 3 is rotated relative to the first body housing 11 automatically.

In the embodiment of the invention, when the cover is rotated from the folded state to the unfolded state relative to the device body, the second body housing is rotated from the first housing orientation to the second housing orientation relative to the first body housing. Therefore, the gap between the first body housing and the second body housing can be increased, the air intake of the fan of the notebook computer can be increased, and the heat dissipation efficiency is improved. Additionally, when the second body housing is rotated from the first housing orientation to the second housing orientation relative to the first body housing, the media unit (such as speaker) is rotated from the first unit orientation to the second unit orientation and faces to the user. The media unit (such as speaker) faces to the user automatically, and provides improved auditory experience. Additionally, the media unit (such as speaker) of the embodiment of the invention is disposed on the device body, and does not occupy limited screen-mounting-space of the cover.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A notebook computer, comprising: a device body, comprising a first body housing and a second body housing, wherein the second body housing pivots on the first body housing; a cover, pivoting on the first body housing and slidably connected to the second body housing, wherein when the cover is rotated from a folded state to an unfolded state relative to the device body, the second body housing is pushed to rotate from a first housing orientation to a second housing orientation relative to the first body housing; and a media unit, pivoting on the first body housing and slidably connected to the second body housing, wherein when the second body housing is rotated from the first housing orientation to the second housing orientation relative to the first body housing, the media unit is rotated from a first unit orientation to a second unit orientation, wherein the media unit comprises a unit body and a unit linkage, the unit linkage is affixed to the unit body, and the unit linkage is slidably connected to the second body housing.

2. The notebook computer as claimed in claim 1, wherein the cover comprises a shaft and a cam, the cover pivots on the first body housing via the shaft, the cam is telescoped on the shaft and is rotated with the shaft, and the cam is connected to the second body housing.

3. The notebook computer as claimed in claim 2, wherein the second body housing comprises a housing groove, the cam comprises a cam post, and the cam post is inserted into the housing groove and is moved along the housing groove.

4. The notebook computer as claimed in claim 1, wherein the unit linkage comprises a linkage slot, the second body housing comprises a housing post, and the housing post is inserted into the linkage slot and is moved along the linkage slot.

5. The notebook computer as claimed in claim 4, wherein the second body housing comprises an inner wall, the housing groove is formed on a first wall surface of the inner wall, the housing post is formed on a second wall surface of the inner wall, and the first wall surface is opposite to the second wall surface.

6. The notebook computer as claimed in claim 4, wherein the first body housing comprises a shaft base, the shaft passes through the shaft base and is rotated relative to the shaft base, the shaft comprises a shaft stopper, the shaft base comprises a base stopper, and when the cover is rotated to an extreme state relative to the device body, the shaft stopper abuts the base stopper.

7. The notebook computer as claimed in claim 4, wherein the first body housing comprises a first housing pivoting portion, the second body housing comprises a second housing pivoting portion, the first housing pivoting portion pivots on the second housing pivoting portion, the cover pivots on a first side of the device body, the first housing pivoting portion and the second housing pivoting portion are located on a second side of the device body, and the first side is opposite to the second side.

8. The notebook computer as claimed in claim 4, wherein when the second body housing is in the first housing orientation relative to the first body housing, a first distance is formed between the shaft and a bottom of the second body housing, and when the second body housing is in the second housing orientation relative to the first body housing, a second distance is formed between the shaft and the bottom of the second body housing, and the second distance is greater than the first distance.

9. The notebook computer as claimed in claim 8, wherein the media unit is a speaker, and when the media unit is in the first unit orientation, a first included angle is formed between the unit body and the first body housing, and when the media unit is in the second unit orientation, a second included angle is formed between the unit body and the first body housing, and the second included angle is greater than the first included angle.

* * * * *